US009126360B2

(12) United States Patent
Qiu et al.

(10) Patent No.: US 9,126,360 B2
(45) Date of Patent: Sep. 8, 2015

(54) METHODS OF OPERATING AN EXTRUSION APPARATUS

(75) Inventors: Wenbin Qiu, Horseheads, NY (US); Joel Andrew Schultes, Corning, NY (US)

(73) Assignee: Corning Incorporated, Corning, NY (US)

(*) Notice: Subject to any disclaimer, the term of this patent is extended or adjusted under 35 U.S.C. 154(b) by 1350 days.

(21) Appl. No.: 12/624,955

(22) Filed: Nov. 24, 2009

(65) Prior Publication Data

US 2011/0121477 A1 May 26, 2011

(51) Int. Cl.

| | |
|---|---|
| ***B29C 47/92*** | (2006.01) |
| ***B28B 3/22*** | (2006.01) |
| ***B28B 17/00*** | (2006.01) |
| ***B29C 47/00*** | (2006.01) |
| ***B29C 47/08*** | (2006.01) |
| ***B30B 15/30*** | (2006.01) |
| *B29C 47/38* | (2006.01) |
| *B29C 47/40* | (2006.01) |
| *B29K 105/24* | (2006.01) |
| *B29K 709/02* | (2006.01) |

(52) U.S. Cl.

CPC . *B29C 47/92* (2013.01); *B28B 3/22* (2013.01); *B28B 3/224* (2013.01); *B28B 17/0081* (2013.01); *B29C 47/0026* (2013.01); *B29C 47/0872* (2013.01); *B30B 15/308* (2013.01); *B29C 47/38* (2013.01); *B29C 47/404* (2013.01); *B29C 2947/926* (2013.01); *B29C 2947/92019* (2013.01); *B29C 2947/9238* (2013.01); *B29C 2947/9259* (2013.01); *B29C 2947/9298* (2013.01); *B29C 2947/92314* (2013.01); *B29C 2947/92485* (2013.01); *B29C 2947/92828* (2013.01); *B29C 2947/92952* (2013.01); *B29K 2105/246* (2013.01); *B29K 2709/02* (2013.01)

(58) Field of Classification Search

USPC ...................................... 264/40.1, 40.4, 40.7

See application file for complete search history.

(56) References Cited

U.S. PATENT DOCUMENTS

| | | | | |
|---|---|---|---|---|
| 3,728,056 | A * | 4/1973 | Theysohn | 425/142 |
| 4,671,908 | A | 6/1987 | Gwinn et al. | 264/40.7 |
| 4,744,930 | A * | 5/1988 | Twist et al. | 264/411 |
| 4,754,413 | A * | 6/1988 | Koster et al. | 700/196 |
| 5,814,251 | A | 9/1998 | Arai et al. | 264/40.1 |
| 6,340,487 | B1 | 1/2002 | Wenger et al. | 426/231 |
| 6,790,023 | B2 | 9/2004 | Collins et al. | 425/145 |
| 2003/0034586 | A1* | 2/2003 | Makino et al. | 264/211 |
| 2005/0132902 | A1* | 6/2005 | D'Arcangelis et al. | 99/455 |

OTHER PUBLICATIONS

Fodil-Pacha Farid et al., "Fuzzy control of the start-up phase of the food extrusion process," Food Control, vol. 18, Issue 9, Sep. 2007, pp. 1143-1148.

* cited by examiner

*Primary Examiner* — Ryan Ochylski

(74) *Attorney, Agent, or Firm* — Joseph M. Homa; Matthew B. McNutt

(57) ABSTRACT

Methods of operating an extrusion apparatus are provided for extruding ceramic or ceramic-forming material. The extrusion apparatus includes an extrusion die mounted with respect to a barrel. At least one screw is rotatably mounted within the barrel, and a feeder is configured to introduce a batch material to the screw. Example methods can adjust at least one of a rotational rate of the screw to an initial rotational rate or a feed rate of the feeder to an initial feed rate when based on a changed operating condition and/or when the batch material reaches the extrusion die. At least one of the rotational rate of the screw or the feed rate of the feeder can then be increased during a transient state until a steady state is reached.

22 Claims, 5 Drawing Sheets

100
110
206
204
116
120d
200
202
102
120c
104
104
118
112
120a
120b
F
113
106
M
M
106
114
108
108

METHODS OF OPERATING AN EXTRUSION APPARATUS

TECHNICAL FIELD

The disclosure relates generally to methods of operating an extrusion apparatus, and more particularly to methods of operating an extrusion apparatus for extruding ceramic or ceramic-forming material.

BACKGROUND

In a conventional extrusion process, an extrusion apparatus is used to extrude ceramic or ceramic-forming material. Typically, abrupt changes in certain operating parameters can expose the material within the extrusion apparatus to one or more pressure spikes. These pressure spikes may interrupt operation of the extrusion apparatus and/or interrupt the quality of the extruded material until the extrusion apparatus once again operates at a steady state.

SUMMARY

The following presents a simplified summary of the disclosure in order to provide a basic understanding of some example aspects described in the detailed description.

In one example, a method of operating an extrusion apparatus is provided for extruding ceramic or ceramic-forming material. The extrusion apparatus includes an extrusion die mounted with respect to a barrel. At least one screw is rotatably mounted within the barrel, and a feeder is configured to introduce a batch material to the screw. The method comprises the steps of adjusting at least one of a rotational rate of the screw to an initial rotational rate or a feed rate of the feeder to an initial feed rate when the batch material reaches the die, and then increasing at least one of the rotational rate of the screw or the feed rate of the feeder during a transient state until a steady state is reached.

In another example, a method of operating an extrusion apparatus is provided for extruding ceramic or ceramic-forming material. The extrusion apparatus includes an extrusion die mounted with respect to a barrel, at least one screw rotatably mounted within the barrel, and a feeder configured to introduce a batch material to the screw. The method includes the steps of adjusting at least one of a rotational rate of the screw to an initial rotational rate or a feed rate of the feeder to an initial feed rate based on a changed operating condition. The method then includes the step of increasing the rotational rate of the screw and the feed rate of the feeder during a transient state until a steady state is reached. A screw fill ratio is maintained substantially constant during the transient state, wherein the screw fill ratio is the ratio of the feed rate with respect to the rotational rate.

In yet another example, a method of operating an extrusion apparatus is provided for extruding ceramic or ceramic-forming material. The extrusion apparatus includes an extrusion die mounted with respect to a barrel. At least one screw is rotatably mounted within the barrel, and a feeder is configured to introduce a batch material to the screw. The method comprises the steps of adjusting at least one of a rotational rate of the screw to an initial rotational rate or a feed rate of the feeder to an initial feed rate based on a changed operating condition. The method then includes the step of increasing the rotational rate of the screw and the feed rate of the feeder during a transient state until a steady state is reached. A maximum pressure of the batch material within the barrel during the transient state does not exceed about 10% of the pressure of batch material within the barrel during the steady state.

BRIEF DESCRIPTION OF THE DRAWINGS

These and other aspects are better understood when the following detailed description is read with reference to the accompanying drawings, in which.

DETAILED DESCRIPTION

Figure 1:
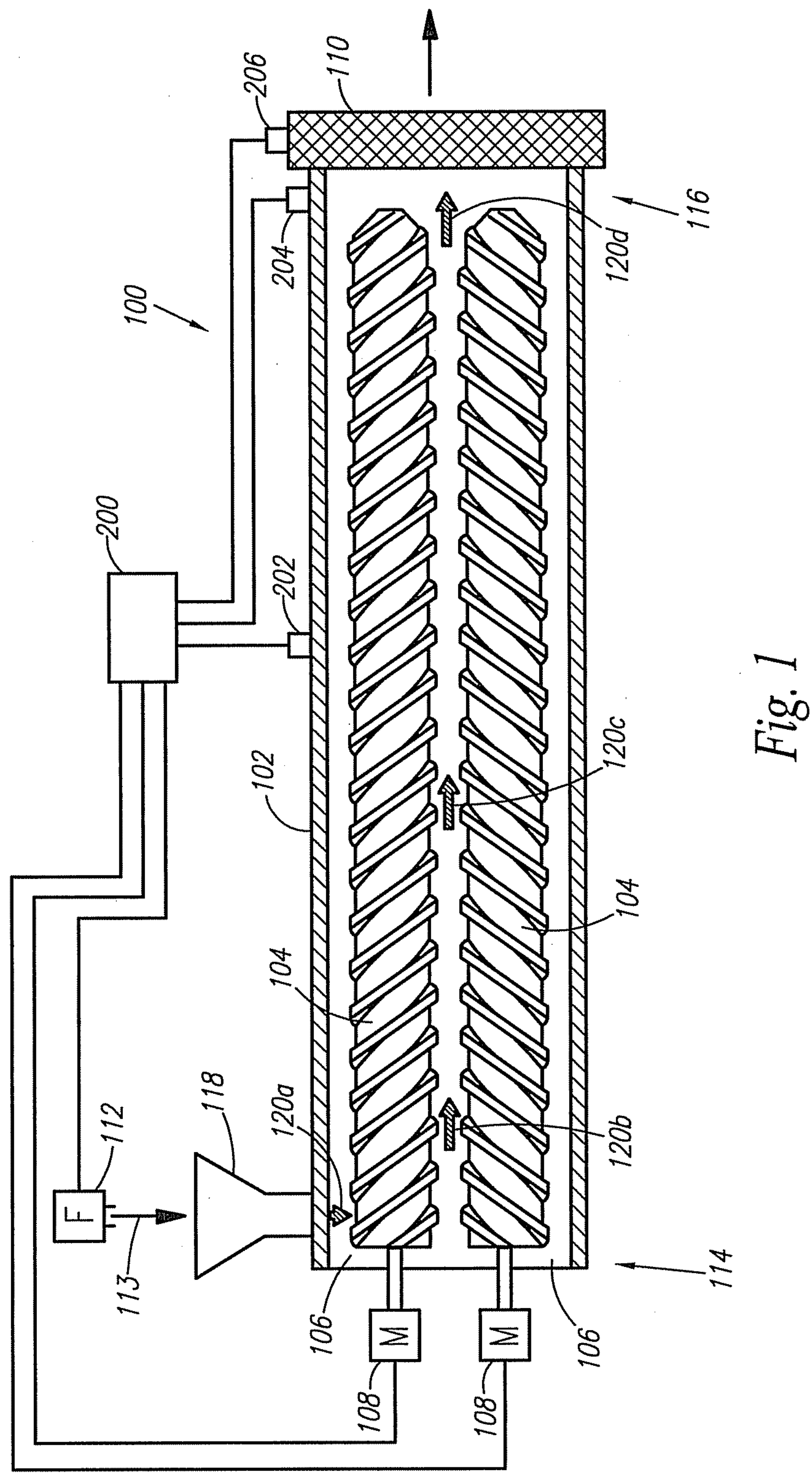
FIG. 1 is a schematic representation of an example extrusion apparatus.

Examples will now be described more fully hereinafter with reference to the accompanying drawings in which example embodiments are shown. Whenever possible, the same reference numerals are used throughout the drawings to refer to the same or like parts. However, aspects may be embodied in many different forms and should not be construed as limited to the embodiments set forth herein.

FIG. 1 provides a schematic representation of an extrusion apparatus 100 for processing a batch of materials. Various batch materials may be provided that comprise ceramic or ceramic forming material. The extrusion apparatus 100 can extrude green bodies of various shapes and sizes. In one example, the extrusion apparatus 100 can be used to extrude a honeycomb body that may be later fired into a honeycomb ceramic body. The honeycomb ceramic body can then be further processed as part of a filter to treat the exhaust stream of an engine. For instance, the honeycomb ceramic body can provide a particulate filter for a diesel or other engine type.

The extrusion apparatus 100 includes a barrel 102 with one or more screws 104 provided therein. In one example embodiment, the barrel 102 can be shaped to provide a plurality of chambers 106 that each house a screw 104 rotatably mounted within and in communication with other chambers 106 at a central portion of the barrel 102. The screws 104 are powered by one or more driving mechanisms 108 (e.g., motors). On a second, downstream end 116 of the extrusion apparatus 100, a schematically represented extrusion die 110 is mounted to the barrel 102. The extrusion die 110 is configured to extrude the batch material in the desired shape, e.g., a honeycomb body. Near the first end 114, a supply port 118 is provided to allow the batch of materials from a feeder 112 to enter the chamber 106. While this example embodiment shows the supply port 118 at one location near the first end 114, alternate embodiments may provide the supply port 118 further downstream from the first end 114. As further illustrated, the extrusion apparatus 100 may include a transient control system 200. The transient control system 200 can be configured to adjust rotation of the screws 104 by way of the driving mechanisms 108 and/or adjust the feed rate of the batch material introduced by the feeder 112. Moreover, the step of adjusting may occur in response to a sensed condition. For example, as shown in FIG. 1, a sensor 202 may be provided to sense a condition along the length of the screw 104. In addition or alternatively, further sensors may be provided to sense a condition downstream of the screw 104. For example, another sensor 204 may be provided at a location downstream of the screw 104 and upstream of the extrusion die 110. As further illustrated, other examples may include a sensor 206 located on the extrusion die 110 downstream of the screw 104. Although not shown, it is still another sensor may be located downstream of the screw 104 and the extrusion die 110. For example, a sensor may be provided to sense conditions of the batch material being extruded from the extrusion die 110. Such a sensor may be used, for example, to sense the velocity, shape, or other parameters of the extruded batch material.

In operation, batch material may be introduced to the supply port 118 by the feeder 112 as indicated by arrow 113. As shown by arrow 120*a*, the batch material then enters into the barrel 102 and is propagated forward by the rotating screws 104 as shown at 120*b*, 120*c* such that the batch can contact and then enter the extrusion die 110 at 120*d*. The rate at which the batch is fed into the supply port 118 (i.e., a feed rate) and/or the rate at which the screws 104 rotate (i.e., a rotational rate or screw speed) can be adjustable at any time during the flow of the batch through the extrusion apparatus 100.

During a start-up state, which lasts until the batch reaches the extrusion die 110, the screw 104 is rotated at a positive start-up rotational rate and the batch is fed at a positive start-up feed rate. The positive start-up rotational rate and the positive start-up feed rate may be constant or vary throughout the start-up state. For example, the positive start-up rotational rate and the positive start-up feed rate may be steady state values. The rotational rate and the feed rate may be lowered to zero or near zero levels once the batch reaches the extrusion die 110 (as indicated by arrow 120*d*) thereby starting a transient state or ramp phase. The transient state can be described as a period in which the rotational rate of the screw 104 and/or the feed rate of the feeder 112 is allowed to increase from a set of values to another set of substantially different values corresponding to a steady state and may include additional time that elapses thereafter until the extrusion apparatus 100 reaches steady state. The extrusion apparatus 100 may be alerted of the arrival of the batch at the extrusion die 110 through the sensor 206 illustrated in FIG. 1.

Figure 2:
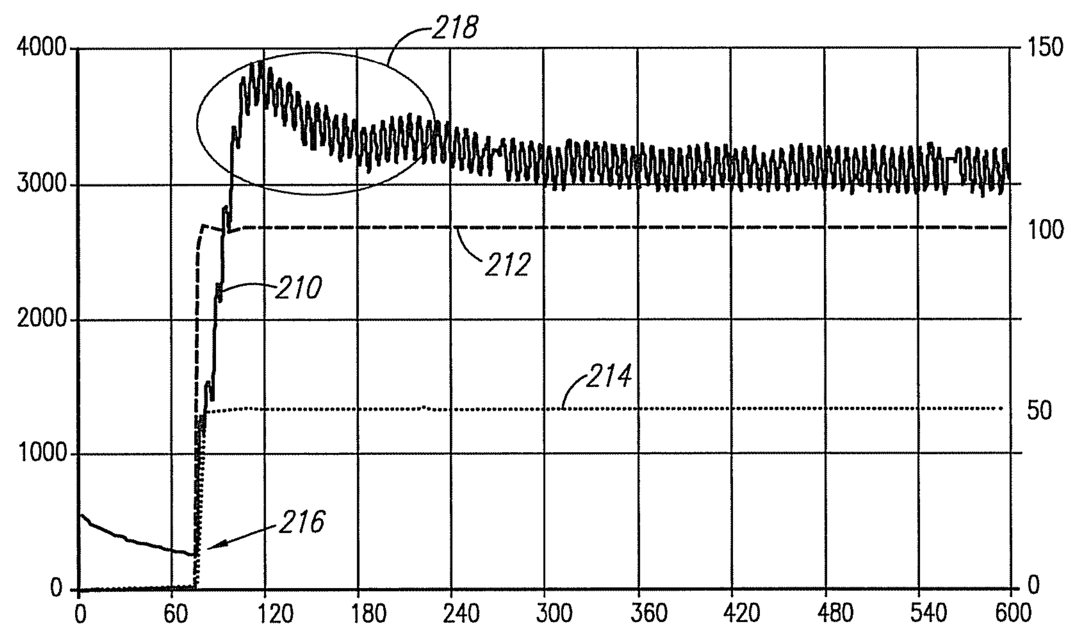
FIG. 2 is a graph of pressure, feed rate and screw speed over time during conventional operation of an extrusion apparatus.

FIG. 2 illustrates changes in pressure inside the barrel 102, a feed rate and a screw speed over time after start-up under settings where the extrusion apparatus 100 is operated in a conventional manner. As shown in FIG. 2, the solid line 210 in the graph represents the maximum extruder pressure, the dashed line 212 represents the feed rate, and the dotted line 214 represents the screw speed. The numbers disposed horizontally at the bottom of the graph indicate time in seconds. The numbers vertically on the left side of the graph indicate pressure in pounds per square inch (psi). The numbers on the right side of the graph indicate the feed rate in pounds per hour (lbs/hr), and the screw speed in revolutions per minute (rpm). Under the conventional mode of operation, once the batch reaches the extrusion die (indicated at 216 in the graph), the feed rate and the rotational rate are instantaneously increased to quickly achieve a steady state feed rate and a steady state rotational rate as shown in FIG. 2. On the other hand, the pressure spikes (indicated at 218) and takes a substantially longer time to reach a steady state as shown on the right portions of the graph (generally at time 300+ seconds). Thus, while the pressure eventually reaches levels corresponding to steady state, an operation of the feeder 112 and the motor 108 in a conventional manner results in an undesirable spike in pressure inside the barrel 102 (FIG. 2) that delays steady state.

The pressure spikes occurring during the transient state can cause damage to the extrusion apparatus 100 or prolong the transient state thereby delaying production of satisfactory extruded product under steady state conditions. Thus, materials produced during the start-up state and transient state is often discarded as waste because the irregular operating conditions result in products that do not conform to the desired qualities. The extrusion apparatus discussed below can provide an automated solution to the above discussed problem and involves a more gradual and controlled manner of increasing the feed rate and the rotational rate during the transient state.

The term "steady state" can describe a stage of the extrusion process where the variables stay at substantially the same value or substantially within a desired range over time. For example, as shown by the line 210 in FIG. 2, the pressure inside the barrel of the extrusion apparatus is maintained within a desired range once the extrusion process reaches a steady state. Even if all parameters are set at steady state levels or values, there may be a delay in the start of steady state and more time may need to pass until steady state conditions are reached. For example, even if the feed rate and the rotational rate are set at values corresponding to steady state operation, some time will have to elapse before the extrusion apparatus can operate under steady state conditions. Extrusion apparatus herein can reduce the time to reach steady state after all of the parameters and the variables are set to steady state levels or values.

Figure 3:
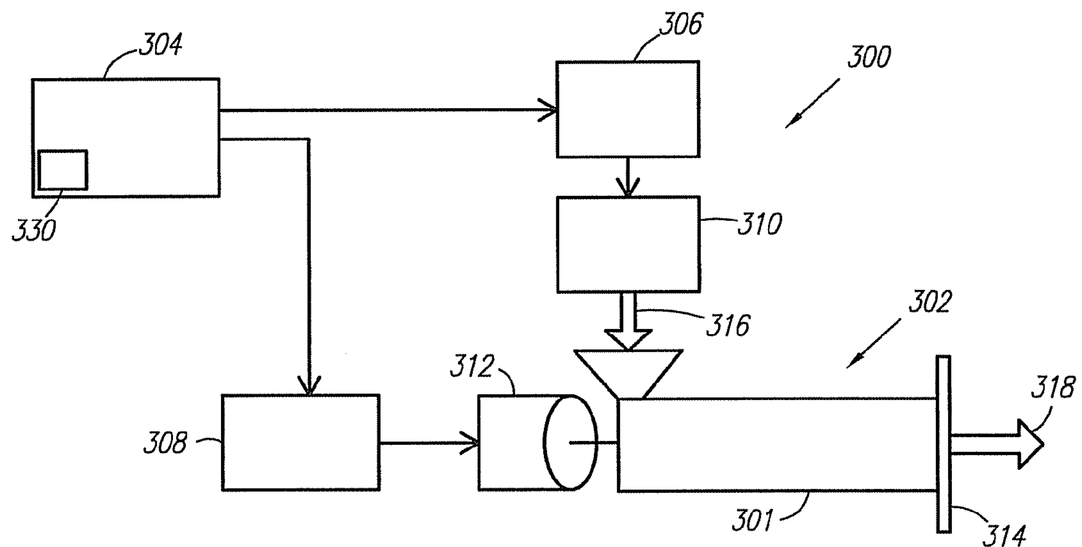
FIG. 3 is a schematic representation of a first example of a transient control system.

FIG. 3 schematically illustrates one version of the extrusion apparatus illustrated in FIG. 1. The extrusion apparatus 302 includes a feeder 310 for supplying a batch 316 to the extrusion apparatus 302. The extrusion apparatus further includes one or more motors 312 associated with at least one screw rotatably mounted within a barrel 301. Rotation of the at least one screw can act to mix the batch and force the batch in a downstream direction of the barrel 301 and eventually through an extrusion die 314, such as a honeycomb extrusion die, to form an extruded body 318. As shown, the extrusion apparatus 302 further includes a transient control system 300 with a ramp controller 304. The ramp controller 304 may be configured to communicate with a feed rate controller 306 for controlling a feeder 310. The ramp controller 304 can also be configured to communicate with a motor speed controller 308 for controlling the motors 312. In this embodiment, information regarding control of the feed rate and the rotational rate is provided to the transient control system 300 before the extrusion apparatus 302 is operated such that the feed rate and the rotational rate are controlled according to the provided information. Specifically, information that is input to the ramp controller 304 may be an initial feed rate for the transient state operation, an initial rotational rate for the transient state operation, a steady state feed rate for steady state operation, a steady state rotational rate for steady state operation, time for starting the transient state, a predetermined duration of the transient state (i.e., a ramp time) or a predetermined ramp rate (i.e., the rate at which either the feed rate or the rotational rate may be increased during the transient state).

Figure 8:
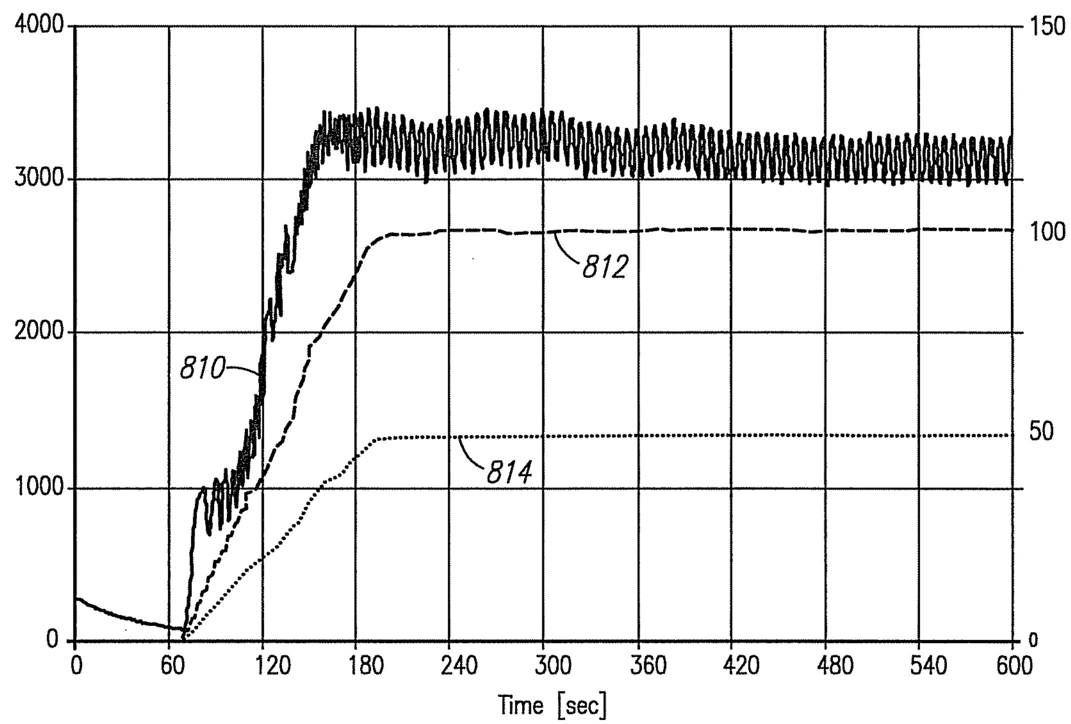
FIG. 8 is another graph of pressure, feed rate and screw speed over time during operation of the extrusion apparatus.

Based on such input information, the ramp controller 304 may output a target feed rate and a target rotational rate during the transient state and transmits these target rates to the motor speed controller 308 and/or the feed rate controller 306 respectively. The target feed rate or the target rotational rate that is output from the ramp controller 304 provide a profile of values to be followed during the transient state up to the steady state values (FIG. 8). The output information from the ramp controller 304 may be further adjusted by batch composition, product type, die type, water content, etc. that are stored in a recipe management system 330 which may be part of the ramp controller 304 or be formed separately in the transient control system 300. The motor speed controller 308 and the feed rate controller 306 control an actual rotational rate of the motor 312 and an actual feed rate of the feeder 310 respectively during the transient state so that the actual rates of the motor 312 and the feeder 310 follow the target rates provided by the ramp controller 304 as closely as possible. While a target rate and an actual rate might be equal in some instances, there may be some variance between the target rate and the actual rate during the transient state.

It should be noted that the disclosure herein is not limited to situations where the feed rate and the rotational rate increase from values near start-up to values at steady state. In other words, the transient state or the ramp phase is not limited to periods immediately or soon after start-up. Indeed, the transient state may be started during a screen change, a die change, a change in production parameters or other changes that may interrupt the steady state pressure of the batch within the barrel. Moreover, it is possible for the extrusion apparatus to go through multiple transient states or ramp phases from beginning to end of one operation. For example, the present disclosure is also applicable to situations where the operation of the extrusion apparatus shifts from a first steady state operation to a second steady state operation (e.g, from 6,000 lb/hr to 8,000 lb/hr in feed rate). The examples herein are applicable to any situation where the pressure of the batch within the barrel, the rotational rate of the motor or the feed rate of the feeder undergoes a substantial change in value.

Figure 4:
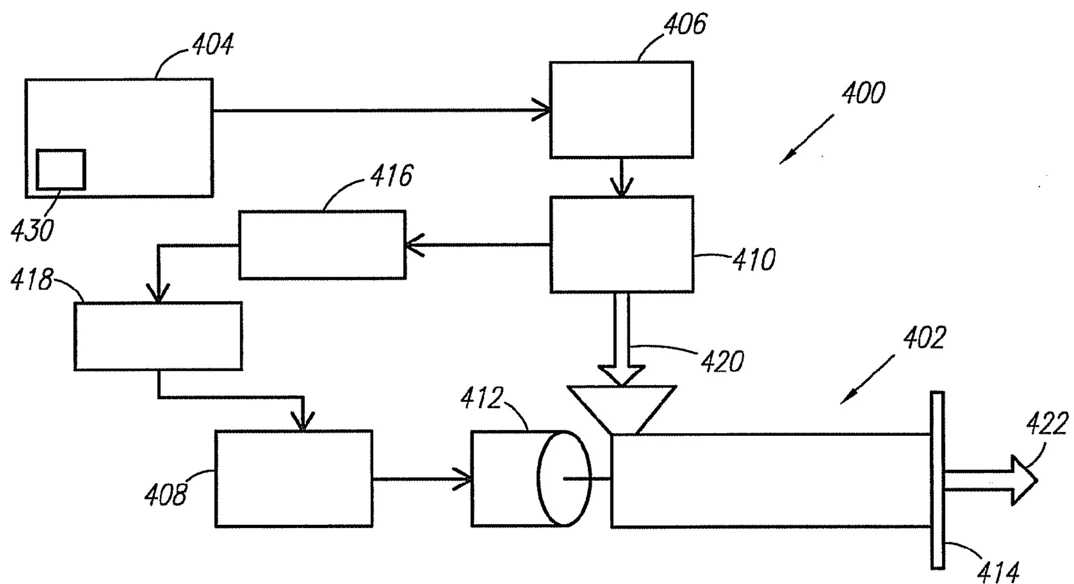
FIG. 4 is a schematic representation of a second example of a transient control system.

FIG. 4 schematically illustrates another version of the extrusion apparatus illustrated in FIG. 1. The extrusion apparatus 402 includes a transient control system 400 with an extrusion apparatus 402, a ramp controller 404, a recipe management system 430, a feed rate controller 406, a feed rate measurement device 416, a ratio control system 418, a motor speed controller 408, a feeder 410 for supply a batch 420, a motor 412 and an extrusion die 414 from which extrudate 422 is formed. In the transient control system 400 of FIG. 4, the rotational rate of the motor 412 of the screw can be adjusted by tracking the feed rate of the feeder 410. Specifically, the ramp controller 404 may be input with information such as an initial rotational rate, a steady state rotational rate, time for starting the transient state, time for duration of the steady state, a predetermined ramp time or ramp rate, a screw fill ratio (i.e., a ratio between the feed rate and the rotational rate), etc. Based on such input information, the ramp controller 404 outputs the target feed rate for the transient state and transmits the target feed rate to the feed rate controller 406 which controls the actual feed rate of the feeder 410. The actual feed rate is monitored by the feed rate measurement device 416 and is transmitted to the ratio control system 418 which controls the screw fill ratio. The ratio control system 418 determines a target rotational rate based on the screw fill ratio and this target rotational rate is output to the motor speed controller 408 which controls the actual rotational rate accordingly. The screw fill ratio with which the target rotational rate is determined may be preset in the ratio control system 418 or may be provided from the ramp controller 404. Moreover, the screw fill ratio maintained during the transient state may be substantially equal to the ratio of the steady state feed rate to the steady state rotational rate.

The transient control system 400 may be particularly advantageous if either of the actual feed rate and the actual rotational rate is easier to effectuate than the other. For example, the actual feed rate of the feeder 410 may depend on a mechanical belt transport system (not shown). In comparison with the motor 412 whose target rotational rate can be effectuated through electrical control with little or no error, the variance between the target feed rate and the actual feed rate may be more significant due to loss occurring in mechanical transmission. In such a case, a desired screw fill ratio can be maintained more precisely by using a transient control system 400 such as in FIG. 6 in which a target rotational rate is continuously adjusted during the transient state based on the measurement of the actual feed rate. The measurement of the actual feed rate and corresponding adjustment of the target rotational rate can be repeated at predetermined intervals during transient state.

Figure 5:
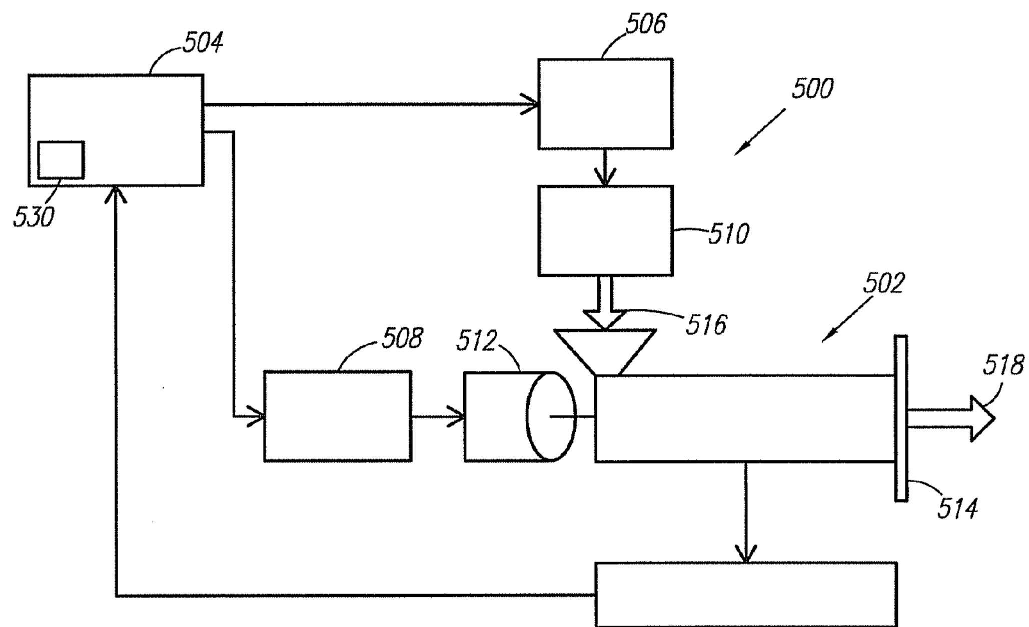
FIG. 5 is a schematic representation of a third example of a transient control system.
Figure 6:
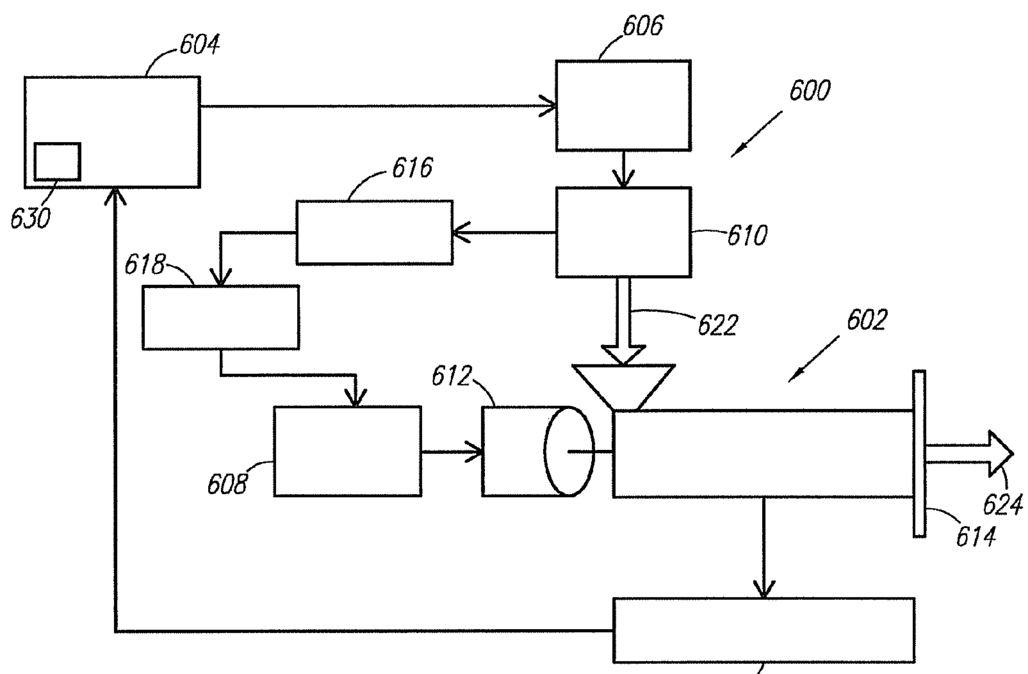
FIG. 6 is a schematic representation of a fourth example of a transient control system.

FIGS. 5 and 6 illustrate closed-loop control variations of the embodiments of FIGS. 3 and 4 respectively. The term "closed-loop control" is to be contrasted with the term "open-loop control", which is descriptive of the embodiments in FIGS. 3 and 4. The "closed-loop" embodiments differ in that they monitor certain conditions in the extrusion process and provide feedback to the ramp controller so that certain variables in the operation of the feeder and the screw may be adjusted in response to the conditions detected in the extrusion apparatus. Various sensing means known in the art can be used to detect conditions in the extrusion process. Each embodiment of the transient control systems in FIGS. 5 and 6 includes an extrusion apparatus 502 or 602, an extrusion die 514 or 614, a motor 512 or 612, a feeder 510 or 610, a ramp controller 504 or 604, a recipe management system 530 or 630, a feed rate controller 506 or 606, a motor speed controller 508 or 608, a batch 516 or 622 and extrudate 518 or 624. Moreover, the transient control system 500 or 600 in these embodiments further includes an extruder measurement device 520 or 620 that monitors or senses conditions including, but not limited to, a pressure between the screw and the die, and the screw torque around the extrusion apparatus 502 or 602. In the transient control system of FIG. 5, similarly to FIG. 3, the target feed rate and the target rotational rate are transmitted from the ramp controller 504 to the feed rate controller 506 and the motor speed controller 508 respectively. In the transient control system of FIG. 6, similarly to FIG. 4, the feed rate measurement device 616 monitors the actual feed rate and transmits this information to the ratio control system 618 which determines the target rotational rate that is output to the motor speed controller 608. In either of these embodiments, the extruder measurement device. 520 or 620 transmits the sensed conditions back to the ramp controller 504 or 604 which, in response, adjusts certain variables for the extrusion process including, but not limited to, the feed rate, the rotational rate, the screw fill ratio, batch temperature, and water content in the batch. The sensing of the conditions can be conducted at areas indicative of the pressure exerted on the extrusion apparatus 502 or 602 and may occur downstream of the screw in the extrusion apparatus, along the length of the screw, etc.

Components of the transient control system including, but not limited to, the ramp controller, the feed rate controller, the ratio control system, and the motor speed controller, may implement computing means such as a programmable logic controller (PLC). Moreover, the components of the transient control system may also implement a proportional-integral-derivative (PID) controller to reduce or correct the error between the actual rates and the target rates.

Figure 7:
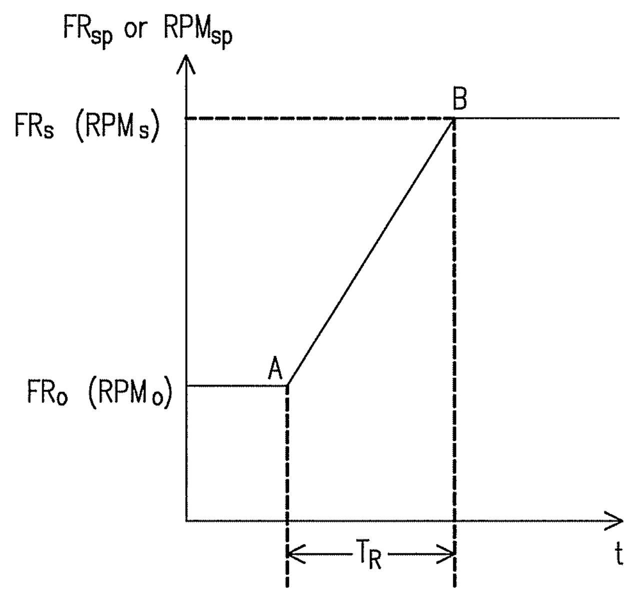
FIG. 7 is a graph of feed rate or screw speed over time when during operation of the extrusion apparatus.

The above embodiments allow control of the feed rate of the feeder and the rotational rate of the screw in a variety of manners to produce a variety of results in the processed extrudate. Acceleration of the feed rate or the rotational rate (i.e., ramp rate) may be maintained substantially constant during the transient state. FIG. 7 illustrates an example in which acceleration of the target feed rate (i.e., feed rate setpoint) or acceleration of the target rotational rate (i.e., rotational rate setpoint or rpm setpoint) is constant during the transient state which is indicated by a constant slope for line A-B. The horizontal axis shows time t while the vertical axis can either show the target feed rate $FR_{SP}$ or the target rotational rate $RPM_{SP}$. The target feed rate or the target rotational rate can be at an initial feed rate $FR_O$ or an initial rotational rate $RPM_O$ respectively prior to increase and can be raised to a steady state feed rate $FR_S$ or a steady state rotational rate $RPM_S$ respectively during a ramp time $T_R$. While it is possible for the duration of transient state to approximate ramp time, it is possible to the transient state to last longer shorter than the ramp time. Thus, the acceleration of the target feed rate during ramp time can be calculated by dividing the difference between the steady state and initial feed rates by the ramp time (i.e., $(FR_{SP}-FR_O)/T_R$) while the acceleration for the rotational rate during ramp time can be calculated by dividing the difference between the steady state and initial rotational rates by the ramp time (i.e., $(RPM_{SP}-RPM_O)/T_R$).

It should be noted that the actual rates are likely to vary from the target rates. Moreover, the acceleration for the feed rate and the acceleration for the rotation rate may be different from one another while remaining constant over the ramp time. In other words, the value of acceleration for the feed rate and the value of acceleration for the rotational rate need not be the same. Also, the values of the initial feed rate and the initial rotational rate need not be the same, and the values of the steady state feed rate and the steady state rotational rate need not be the same. Moreover, FIG. 7 indicates only one manner of controlling the target rates over ramp time, i.e., maintaining constant acceleration over the ramp time. Operation of the extrusion apparatus can also include increasing the target rates while varying acceleration over the ramp time. For example, in transient control systems that implement a feed rate measurement device and a ratio control system as in FIGS. 4 and 6, it is unlikely that the value of acceleration for the target rotational rate will remain constant over the ramp time although the acceleration of the target rotational rate may appear to be substantially constant.

Furthermore, while the above discussion of FIG. 7 used the terms "initial feed rate" and the "initial screw speed", control of the ramp phase may also occur during periods other than immediately or soon after start-up where the feed rate and the rotational rate increase from zero or near zero values. The transient state or ramp phase between two different sets of steady state conditions can also be controlled where two or more sets of steady state conditions are utilized during an operation of the extrusion apparatus. Thus, the "initial feed rate" and "initial screw speed" in FIG. 7 can refer to values corresponding to a distinct set of steady state conditions as well as near zero values after start-up.

FIG. 8 shows the change in pressure over time when the actual feed rate and the actual rotational rate are increased at a substantially constant rate of acceleration (i.e., ramp rate) during the transient state. As shown in FIG. 8, the solid line 810 in the graph represents the maximum extruder pressure, the dashed line 812 represents the feed rate, and the dotted line 814 represents the screw speed. The numbers disposed horizontally at the bottom of the graph indicate time in seconds. The numbers vertically on the left side of the graph indicate pressure in pounds per square inch (psi). The numbers on the right side of the graph indicate the feed rate in pounds per hour (lbs/hr), and the screw speed in revolutions per minute (rpm). FIG. 8 also shows that the ramp time begins at about 70 seconds after start-up and lasts about 2 minutes. Of course, different ramp time or ramp rate can be selected for different batch compositions, product types, steady state values, water content etc. As stated before, the screw fill ratio during the transient state may equal the ratio between the steady state feed rate and the steady state rotational rate or the ramp rate may vary over the ramp time such that the ramp rate is not linear. It can be seen, in the case of FIG. 8, that the value of maximum extruder pressure reaches a steady state range and remains at that range before the passage of ramp time. Also, it can be seen that the maximum pressure reached at any point by the batch inside the barrel of the extrusion apparatus is substantially equal to the pressure in the extrusion apparatus at steady state. It is possible, through calculation, trial-and-error or other means known in the art, to obtain values for the feed rate and the rotational rate such that the maximum pressure reached in the extrusion apparatus is limited to within a predetermined percentage (e.g., about 5-10%) of the pressure range for steady state conditions. For example, adjustments made based on feedback of sensed conditions may be used to limit the pressure inside the extrusion apparatus within a predetermined range with the transient control systems of FIGS. 5-6.

While FIG. 8 illustrates a constant acceleration for both the actual feed rate and the actual rotational rate, it may also be possible to prevent undesired pressure spikes even though the acceleration of either rate is not constant throughout the ramp time. In other words, constant acceleration of the rotational rate or the feed rate is not required to prevent pressure spikes inside the barrel and other manipulations of the rotational rate and/or the feed rate may accomplish a similar effect.

Figure 9:
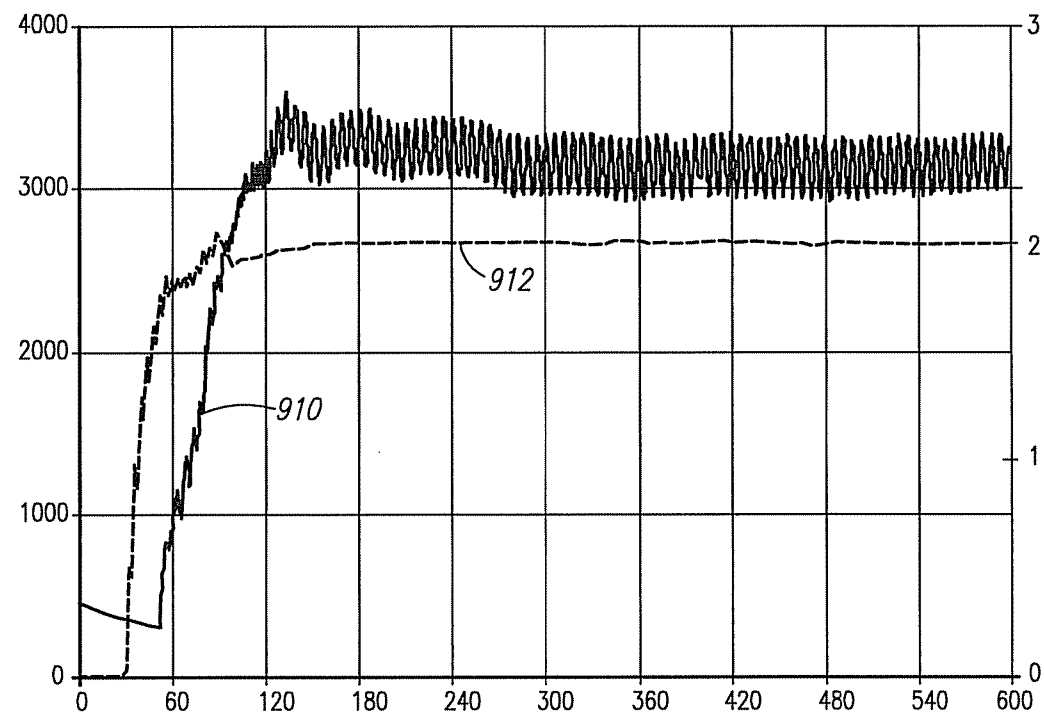
FIG. 9 is yet another graph of pressure, feed rate and screw speed over time during operation of the extrusion apparatus.

Alternatively, the feed rate and the rotational rate may be adjusted during the transient state by controlling a ratio of the feed rate to the rotational rate (i.e., the screw fill ratio) as shown in FIG. 9 using the embodiments in FIG. 3 or 5. In FIG. 9, the solid line 910 in the graph represents maximum extruder pressure and the dashed line 912 in the graph represents the screw fill ratio. The numbers disposed horizontally at the bottom of the graph indicate time in seconds. The numbers vertically on the left side of the graph indicate pressure in pounds per square inch (psi). The numbers on the right side of the graph indicate the screw fill ratio. As shown, the screw fill ratio is increased to near a predetermined value over a short span of time after start up and in order to push the batch forward in the barrel. When the batch reaches the extrusion die (e.g., about 50 seconds after start-up), the screw fill ratio has almost reached the steady state value and undergoes minor increase over the transient state. The screw fill ratio is then kept substantially constant after a given amount of time has elapsed. Even if the screw fill ratio may appear to be near a certain value, the target feed rate and the target rotational rate may undergo increase until steady state values are reached.

It will be apparent to those skilled in the art that various modifications and variations can be made without departing from the spirit and scope of the claims set forth below.

What is claimed is:

1. A method of operating an extrusion apparatus for extruding ceramic or ceramic-forming material, the extrusion apparatus including an extrusion die mounted with respect to a barrel, at least one screw rotatably mounted within the barrel, and a feeder configured to introduce a batch material to the screw, the method comprising the steps of:

rotating the screw relative to the barrel at a rotational rate;

adjusting a feed rate of the feeder to an initial feed rate when the batch material reaches the die; and then increasing the feed rate of the feeder without input of the rotational rate of the screw during a transient state until a steady state is reached.

2. The method of claim 1, wherein the step of adjusting occurs in response to a sensed condition.

3. The method of claim 2, wherein the condition is sensed downstream of the screw.

4. The method of claim 2, wherein the condition is sensed along the length of the screw.

5. The method of claim 1, wherein a screw fill ratio is maintained substantially constant during the transient state, wherein the screw fill ratio is the ratio of the feed rate with respect to the rotational rate.

6. The method of claim 5, wherein the screw fill ratio is maintained substantially constant by controlling the rotational rate.

7. The method of claim 1, the extrusion apparatus further including a transient control system configured to adjust at least one of the rotational rate or the feed rate during the transient state.

8. The method of claim 7, wherein the control system is operated as a closed-loop control system.

9. The method of claim 7, wherein the control system is operated as an open-loop control system.

10. The method of claim 7, further comprising the steps of determining a target feed rate using a ramp controller for a given time in the transient state based on at least one of a ramp time, the initial feed rate, a steady-state feed rate, and the given time.

11. The method of claim 10, wherein the feed rate is controlled based on the determined target feed rate.

12. The method of claim 7, further comprising the step of determining a target rotational rate for the screw using a ratio controller based on an actual feed rate of the feeder and a desired screw fill ratio, wherein the screw fill ratio is the ratio of the feed rate with respect to the rotational rate.

13. The method of claim 12, wherein the rotational rate is controlled based on the determined target rotational rate.

14. The method of claim 1, wherein prior to the step of adjusting, the extrusion apparatus is operated at a start-up state wherein the screw has a positive start-up rotational rate and the feeder has a positive start-up feed rate such that the batch material is introduced by the feeder to the screw and begins propagating within the barrel toward the extrusion die.

15. The method of claim 1, further comprising the step of increasing the rotational rate of the screw during the transient state until the steady state is reached.

16. A method of operating an extrusion apparatus for extruding ceramic or ceramic-forming material, the extrusion apparatus including an extrusion die mounted with respect to a barrel, at least one screw rotatably mounted within the barrel, and a feeder configured to introduce a batch material to the screw, the method comprising the steps of:

rotating the screw relative to the barrel at a rotational rate;

adjusting a feed rate of the feeder to an initial feed rate based on a changed operating condition; and then increasing the feed rate of the feeder without input of the rotational rate of the screw during a transient state until a steady state is reached, wherein a screw fill ratio is maintained substantially constant during the transient state, wherein the screw fill ratio is the ratio of the feed rate with respect to the rotational rate.

17. The method of claim 16, wherein prior to the step of adjusting, the extrusion apparatus is operated at a start-up state wherein the screw has a positive start-up rotational rate and the feeder has a positive start-up feed rate such that the batch material is introduced by the feeder to the screw and begins propagating within the barrel toward the extrusion die.

18. The method of claim 16, further comprising the step of increasing the rotational rate of the screw during the transient state until the steady state is reached.

19. A method of operating an extrusion apparatus for extruding ceramic or ceramic-forming material, the extrusion apparatus including an extrusion die mounted with respect to a barrel, at least one screw rotatably mounted within the barrel, and a feeder configured to introduce a batch material to the screw, the method comprising the steps of:

rotating the screw relative to the barrel at a rotational rate;

adjusting a feed rate of the feeder to an initial feed rate based on a changed operating condition; and then increasing the feed rate of the feeder without input of the rotational rate of the screw during a transient state until a steady state is reached, wherein a maximum pressure of the batch material within the barrel during the transient state is not more than about 10% greater than the pressure of batch material within the barrel during the steady state.

20. The method of claim 19, wherein prior to the step of adjusting, the extrusion apparatus is operated at a start-up state wherein the screw has a positive start-up rotational rate and the feeder has a positive start-up feed rate such that the batch material is introduced by the feeder to the screw and begins propagating within the barrel toward the extrusion die.

21. The method of claim 19, wherein the maximum pressure of the batch material within the barrel during the transient state is not more than about 5% greater than the pressure of batch material within the barrel during the steady state.

22. The method of claim 19, further comprising the step of increasing the rotational rate of the screw during the transient state until the steady state is reached.

* * * * *